(12) United States Patent
Kim (10) Patent No.: US 10,126,920 B2
(45) Date of Patent: Nov. 13, 2018

(54) METHOD AND APPARATUS FOR PROVIDING INFORMATION THROUGH NETWORK

(71) Applicant: SAMSUNG ELECTRONICS CO., LTD., Gyeonggi-do (KR)

(72) Inventor: Hyo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 663 days.

(21) Appl. No.: 13/903,684

(22) Filed: May 28, 2013

(65) Prior Publication Data

US 2013/0268863 A1     Oct. 10, 2013

Related U.S. Application Data

(63) Continuation of application No. 12/018,816, filed on Jan. 24, 2008, now abandoned.

(30) Foreign Application Priority Data

Apr. 26, 2007    (KR) ........................ 10-2007-0040943

(51) Int. Cl.
     *G06F 3/14*        (2006.01)
     *G06F 3/0484*     (2013.01)
     *G06F 17/30*      (2006.01)

(52) U.S. Cl.
     CPC ...... *G06F 3/0484* (2013.01); *G06F 17/30864* (2013.01); *G06F 17/30905* (2013.01)

(58) Field of Classification Search
     CPC ..................................... G06F 3/14; G06F 3/17

(Continued)

(56) References Cited

U.S. PATENT DOCUMENTS 7,222,306 B2    5/2007   Kaasila et al.
7,636,766 B2   12/2009   Abramowitz
(Continued)

FOREIGN PATENT DOCUMENTS

KR    10-2004-0046832 A     6/2004
KR    10-2005-0109638        11/2005
(Continued)

OTHER PUBLICATIONS

Communication dated Feb. 28, 2014 issued by the Korean State Intellectual Property Office in counterpart Korean Patent Application No. 10-2007-0040943.

(Continued)

*Primary Examiner* — Ruay L Ho
(74) *Attorney, Agent, or Firm* — Sughrue Mion, PLLC (57) ABSTRACT

Provided is a method and apparatus for providing information through a network. The method of providing information through a network includes: setting correspondence relations between first information, that is provided in a network site and a user wants to acquire through the network, and the appearance of an application; requesting a server for the first information and receiving a response; analyzing second information included in the response; and displaying the second information by manipulating the appearance of the application, according to the correspondence relations without visiting the network site or activating another application.

14 Claims, 8 Drawing Sheets

(58) Field of Classification Search
USPC ........ 715/700, 733, 804; 707/104.1; 705/37; 709/203, 206
See application file for complete search history.

(56) References Cited

U.S. PATENT DOCUMENTS

| | | | |
|---|---|---|---|
| 7,817,163 | B2 | 10/2010 | Hanggie et al. |
| 7,822,806 | B2* | 10/2010 | Frank ........................ G06F 8/34 709/203 |
| 8,015,490 | B2 | 9/2011 | Ogikubo |
| 8,131,276 | B2 | 3/2012 | Lee |
| 2006/0026067 | A1 | 2/2006 | Nicholas et al. |
| 2007/0038934 | A1* | 2/2007 | Fellman ........................ 715/700 |
| 2007/0078735 | A1 | 4/2007 | Wan et al. |
| 2007/0100959 | A1 | 5/2007 | Eichstaedt et al. |
| 2007/0130541 | A1* | 6/2007 | Louch ................. G06F 3/04817 715/804 |
| 2007/0175998 | A1 | 8/2007 | Lev |
| 2007/0180448 | A1 | 8/2007 | Low et al. |
| 2007/0265954 | A1* | 11/2007 | Mather ................. G06F 3/0481 705/37 |
| 2008/0270907 | A1 | 1/2008 | Kim |
| 2008/0140722 | A1* | 6/2008 | Jakobovits ................. 707/104.1 |
| 2009/0240568 | A1 | 9/2009 | Ramer et al. |
| 2009/0240586 | A1 | 9/2009 | Ramer et al. |
| 2010/0063877 | A1 | 3/2010 | Soroca et al. |
| 2013/0290885 | A1* | 10/2013 | Kobayashi ..................... 715/765 |
| 2014/0129658 | A1* | 5/2014 | Barman ................. G06Q 10/10 709/206 |

FOREIGN PATENT DOCUMENTS

| | | |
|---|---|---|
| KR | 10-0573037 B1 | 5/2006 |
| KR | 10-0650351 B1 | 11/2006 |
| KR | 10-2006-0126048 A | 12/2006 |

OTHER PUBLICATIONS

Communication dated Jul. 16, 2013 issued by the Korean Intellectual Property Office in counterpart Korean Patent Application No. 10-2007-0040943.

Communication dated May 28, 2014 issued by the Korean Intellectual Property Office in counterpart Korean Patent Application No. 10-2007-0040943.

* cited by examiner

METHOD AND APPARATUS FOR PROVIDING INFORMATION THROUGH NETWORK

CROSS-REFERENCE TO RELATED PATENT APPLICATION

This application claims priority from U.S. application Ser. No. 12/018,816, filed on Jan. 24, 2008, which claims priority from Korean Patent Application No. 10-2007-0040943, filed on Apr. 26, 2007, in the Korean Intellectual Property Office, all of the above-identified applications are hereby incorporated by reference in their entirety.

BACKGROUND OF THE INVENTION

1. Field of the Invention

Methods and apparatuses consistent with the present invention relate to providing information through a network, and more particularly, to displaying information provided through a network by manipulating the appearance of an application.

2. Description of the Related Art

A change from a related art passive information exchange method of responding to an information request from a user to technologies proposed with a trend of Web 2.0 such as Rich Site Summary or Really Simple Syndication (RSS), Asynchronous JavaScript and XML (AJAX), and Wild services shows that user attention has become focused on active participation and active interaction. In addition, a personalized page provided from various related art web pages or a customizing technology such as a Graphical User Interface (GUI) widget is an example that reflects a desire of a user who wants to be provided with information processed only for the user. This method of providing information is mainly classified into a method using a typical web browser and a method using an additional web application.

In order to check information desired by a user in a related art information acquisition method, the user has to visit a web site providing the information or execute an additional web application. When information is provided through a web browser and the information includes time-dependent factors that vary according to time, the user must inconveniently visit a corresponding web site every time and check content in order to obtain updated information. In addition, when information is provided through an additional web application, due to space occupied by the additional application, there is an inconvenience of hiding a screen of a basic application.

Figure 1:
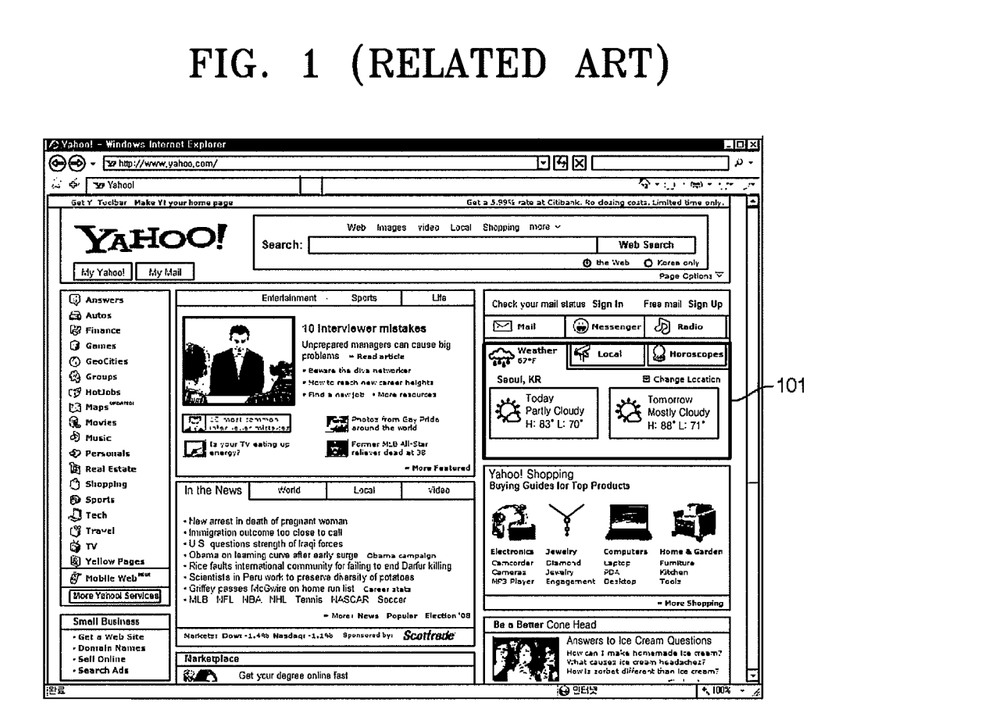
FIG. 1 is a view showing a method of providing live information such as weather on a part of a screen of a related art web browser.

FIG. 1 is a view showing a method of providing live information such as weather on a part of a screen of a related art web browser. When it is assumed that a region where a user currently lives is Seoul and the user is provided with weather information on Seoul on a part 101 of a particular web site, in order for the user to check the weather in the morning, the user has to visit the web site. In addition, in order to check for a change in weather information in the afternoon, the user has to visit the same web site again. In the above example, if, instead of the weather, the provided information is stock price information which changes in units of a minute, then in order to obtain updated information, the user has to visit a corresponding web site more frequently and the time interval decreases.

Figure 2:
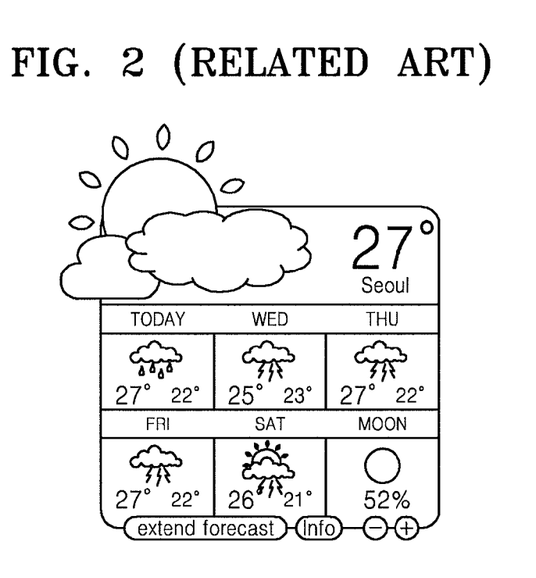
FIG. 2 is a view showing a method of providing weather information which periodically changes from a related art web application.

FIG. 2 is a view showing a method of providing weather information which periodically changes from a related art web application. The user sets a region on which weather information is to be obtained and periodically receives the information through a web application such as a Web widget. This application reduces the inconvenience of visiting a corresponding web page every time as in the method using the web browser shown in FIG. 1. However, there still is the inconvenience of having to execute an additional web application or hide a screen of a basic application of the user due to additional screen occupation.

Figure 3:
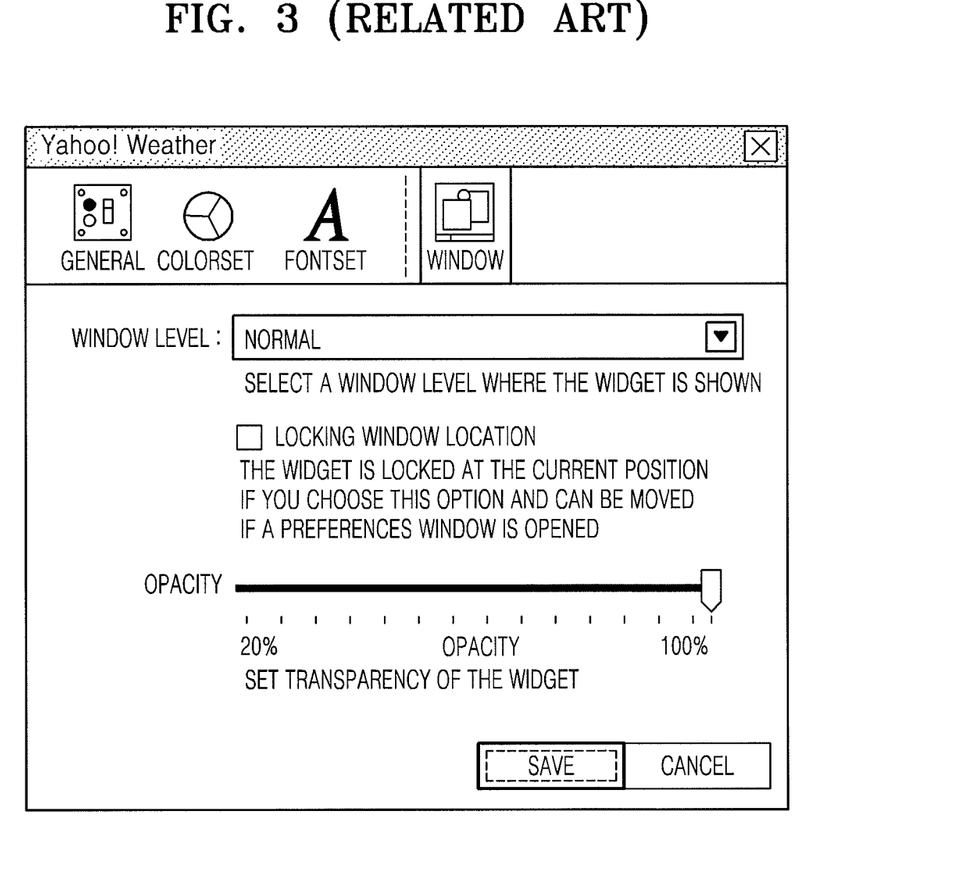
FIG. 3 is view showing a method of setting the appearance of a related art web application.

FIG. 3 is a view showing a method of setting the appearance of a related art web application. In the related art, in association with appearance setting of the web application, changes in basic characteristics (for example, opacity or a position of a window) of an application are provided as a common function. Therefore, there is inconvenience in that a flexible link with external data is difficult and functions of providing information changed by the flexible link cannot be set together.

As described above, in the method of acquiring information through a network, particularly, in the method using a web browser, although the need for visiting the weather service in order to check weather decreases, the need for visiting a web site that provides the weather information still exists. In addition, in consideration of a general electronic appliance such as an Internet protocol television (IPTV) connected through a network, instead of in a related art personal computer (PC)-based environment, the inconvenience increases. Similarly, in the method using a web application, there is a problem in that an additional application is executed or a part of a screen of a basic application is hidden. In consideration of the aforementioned problems, a method of periodically requesting information designated by a user in advance and visually providing the information to the user, without allocating an additional application such as a web browser or a screen, is needed. In addition, functions of setting and managing correspondence relations between the information and the appearances of applications generated by an application engine are required.

SUMMARY OF THE INVENTION

The present invention provides an information acquisition method and apparatus for solving an inconvenience of operating a web browser and visiting a web site every time time-varying information needs to be acquired, omitting an additional application besides an application that is currently used by a user or screen allocation in order to extendedly apply information acquisition and display technology to a general network-based electronic appliance, and visually simplifying the provided information so that it is easily provided, thereby increasing convenience for a user and enabling natural user recognition. In addition, the present invention also provides functions of both setting and managing correspondence relations between the acquired information and the appearances of the applications.

According to one aspect of the present invention, there is provided a method of providing information through a network, including setting correspondence relations between information that the user wants to acquire and the appearance of an application; requesting a server for the information and receiving a response; analyzing information received in the response; and directly displaying the analyzed information by manipulating the appearance of the application, according to the correspondence relations.

According to another aspect of the present invention, in displaying the analyzed information by manipulating the appearance of the application, the appearance of the application may be changed according to a type and content of the information which the user wants to acquire.

According to another aspect of the present invention, the setting of the correspondence relations may include providing a predetermined menu screen used for setting the correspondence relations, and the predetermined menu screen may be a menu screen for setting one or more items of a plurality of items associated with the correspondence relations.

According to another aspect of the present invention, the information that the user wants to acquire may include one or more of weather, a stock price, an exchange rate, a traffic situation, a daily horoscope, a biorhythm, and a sports game result.

According to another aspect of the present invention, requesting the information and receiving the response may be automatically performed during a predetermined period.

According to another aspect of the present invention, the requesting the information and receiving the response may be performed by using Rich Site Summary or Really Simple Syndication (RSS).

According to another aspect of the present invention, the requesting the information and receiving the response may be performed by using Asynchronous JavaScript and XML (AJAX).

According to another aspect of the present invention, in the displaying of the analyzed information by manipulating the appearance of the application, one or more of a form of an object of the application, a shape of an object of the application, a color of an object of the application, and a movement of an object of the application may be changed.

According to another aspect of the present invention, there is provided an apparatus for providing information through a network, including an application engine setting correspondence relations between the information which the user wants to obtain and the appearance of an application; a communication unit requesting a server for the information and receiving a response; an information analysis unit analyzing information received in the response; and an application display control unit directly displaying the analyzed information by manipulating the appearance of the application, according to the correspondence relations.

According to another aspect of the present invention, the application display control unit may change the unit appearance of the application according to a type and content of the information that the user wants to acquire.

According to another aspect of the present invention, the application engine may provide a predetermined menu screen used for setting the correspondence relations, and the predetermined menu screen may be a menu screen used for setting one or more items of a plurality of items associated with the correspondence relations.

According to another aspect of the present invention, the information that the user wants to acquire may include one or more of weather, a stock price, an exchange rate, a traffic situation, a daily horoscope, a biorhythm, and a sports game result.

According to another aspect of the present invention, the communication unit automatically may request the information and receives the response during a predetermined period.

According to another aspect of the present invention, the communication unit may request the information and receives the response by using RSS.

According to another aspect of the present invention, the communication unit may request the information and receives the response by using AJAX.

According to another aspect of the present invention, the application display control unit may change one or more of a form of an object of the application, a shape of an object of the application, a color of an object of the application, and a movement of an object of the application.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE INVENTION

Hereinafter, exemplary embodiments of the present invention will be described in detail with reference to the attached drawings.

Figure 4A:
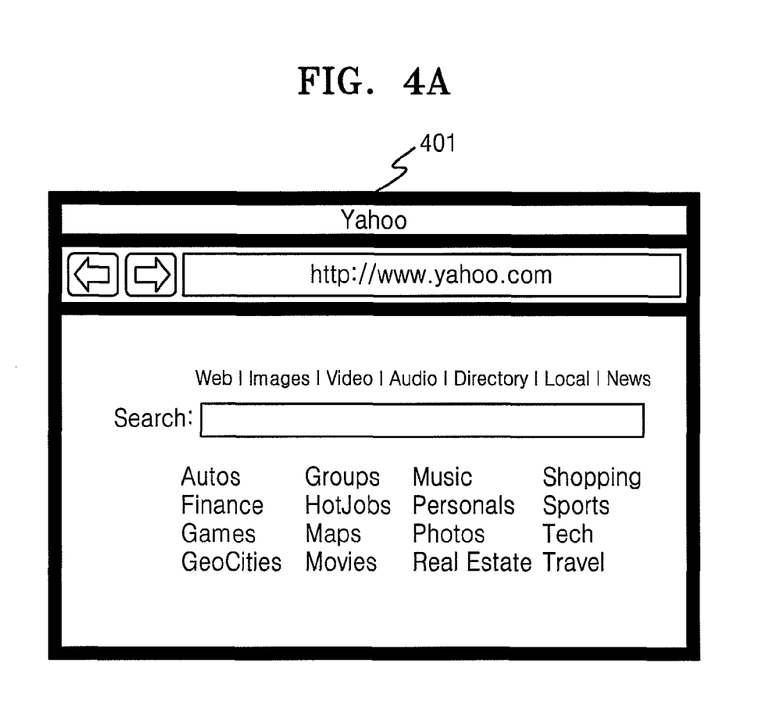
FIGS. 4A and 4B are views showing a method of acquiring stock price information through a network by using an application and displaying a frame color of the application in different ways according to a rise and a fall of an acquired stock price, according to an exemplary embodiment of the present invention.
Figure 4B:
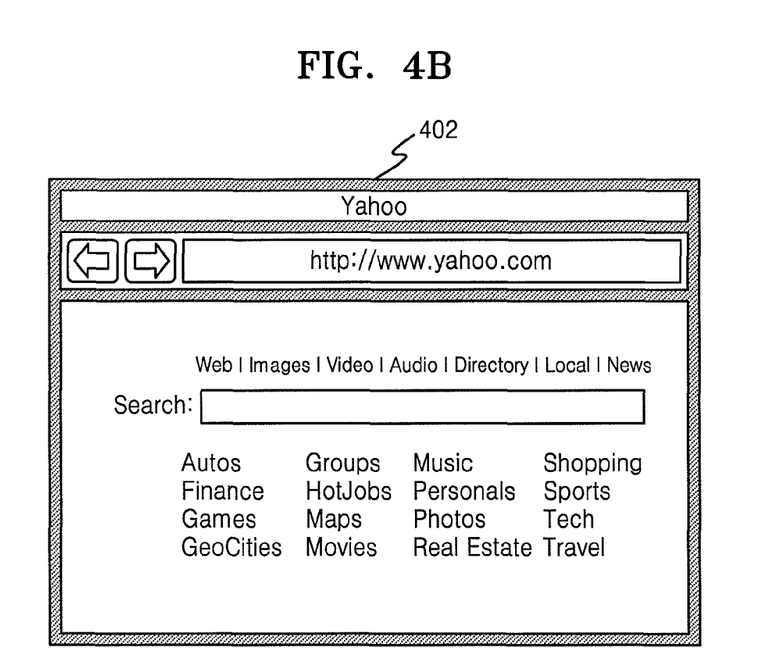

FIGS. 4A and 4B are views showing a method of acquiring stock price information through a network by using an application and displaying a frame color of the application in different ways according to a rise and a fall of an acquired stock price according to an exemplary embodiment of the present invention.

When a normal operation is performed by using an application such as a web browser after the frame color of the application is set to be changed and displayed according to the stock price information which the user wants to obtain, the application automatically requests from the server the stock price information on an interested item set by the user at a predetermined time interval also set by the user, for example, at five-minute intervals, and receives responses to the requests. As shown in FIGS. 4A and 4B, after an operation of extracting the received stock price information from the responses and analyzing the information, when the stock price increases (401), the frame color of the application turns red, and when the stock price decreases (402), the frame color of the application turns blue.

In this operation, the user can indirectly receive corresponding stock price information by using the application, without executing an additional application besides the application currently used by the user or allocating an additional space to the current application, by visually simplifying the corresponding stock price information.

Figure 5A:
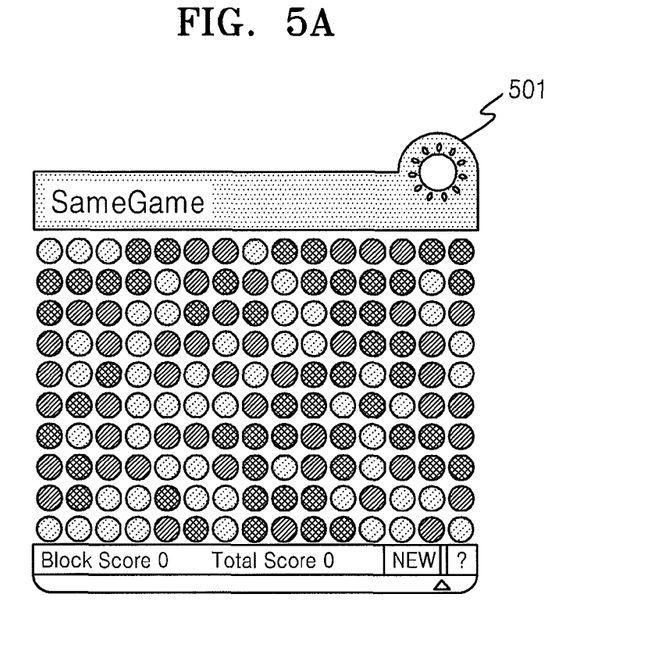
FIGS. 5A and 5B are views showing a method of acquiring weather information through a network by using an application and changing a frame color or a mark of the application according to the acquired weather state so as to display the information, according to another exemplary embodiment of the present invention.
Figure 5B:
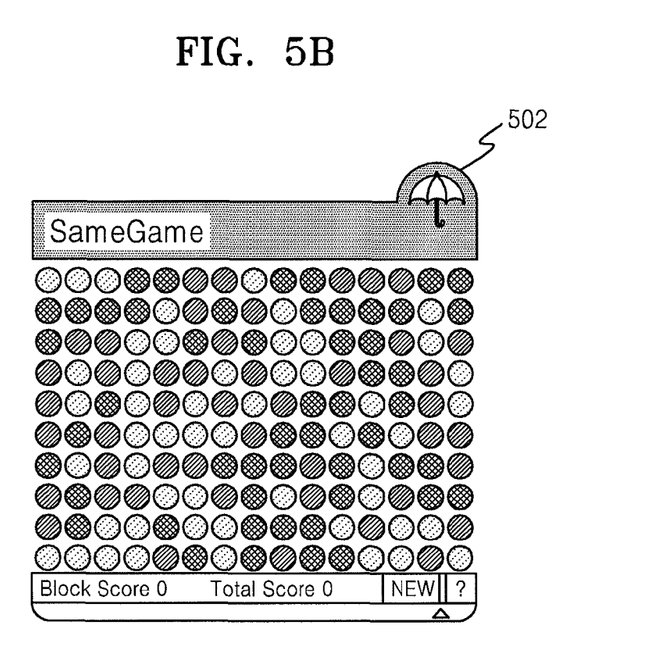

FIGS. 5A and 5B are views showing a method of acquiring weather information through a network by using an application and changing a frame color or a mark of the application according to the acquired weather state so as to display the information according to another exemplary embodiment of the present invention.

When the user wants to know weather of a region such as a residential area in advance, it is assumed that the user sets the frame color or the mark on the application to be changed and displayed, and the user plays a game as shown in the figure. The game application automatically requests weather information on the region set by the user to a server at a predetermined time interval also set by the user, for example, at three-hour time intervals in a case of the weather information, and receives responses to the requests. Associated operations are similar to as shown in FIGS. 5A and 5B. In an operation of displaying the weather information by manipulating the appearance of the application, when the weather is fine, the frame color is set to a bright color, and a mark 501 having a shape of the sun may be displayed. When it rains, the frame color is set to a dark color, and a mark 502 having a shape of an umbrella may be displayed.

Figure 6:
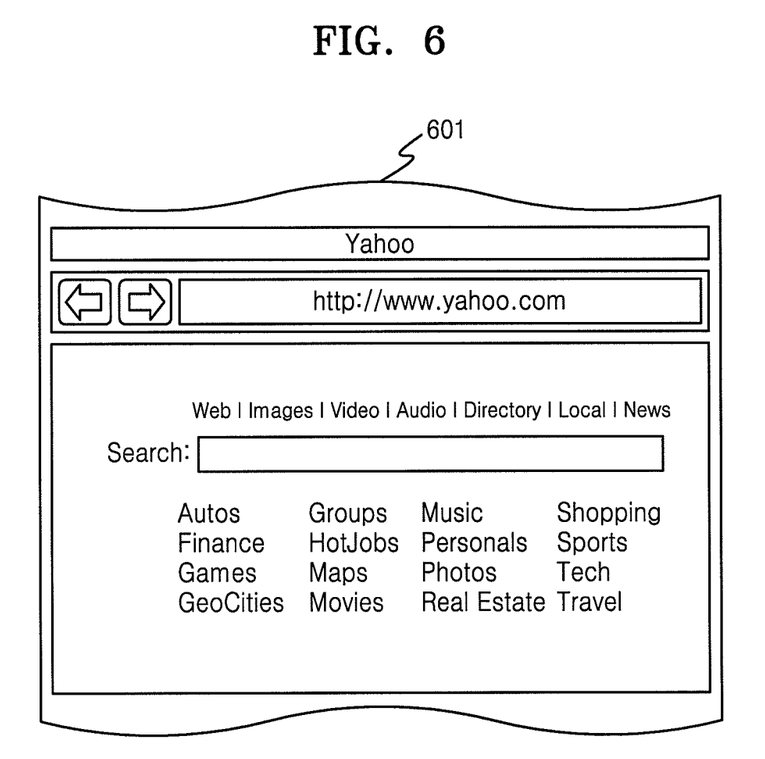
FIG. 6 is a view showing a method of acquiring weather information through a network by using an application and changing a frame shape of the application according to the acquired weather state so as to display the information, according to another exemplary embodiment of the present invention.

FIG. 6 is a view showing a method of acquiring weather information through a network by using an application and changing a frame shape of the application according to the acquired weather state so as to display the information according to another exemplary embodiment of the present invention.

Similarly to FIGS. 4A to 5B, in regard to FIG. 6, it is assumed that the user wants to display the weather information by changing the frame shape of the application. Associated operations are similar to those shown in FIGS. 5A and 5B. In an operation of displaying the weather information by using the appearance of the application, when the weather is fine, a background pattern may be displayed in a round shape. When it rains, the background pattern may be displayed in a pattern of vertical lines, or when thunder and lightning occur, as shown in FIG. 6, the frame may be displayed as being bended (601).

As described in relation to the above exemplary embodiments, the application can be applied to various devices or applications (for example, the game application shown in FIGS. 5A and 5B) which can acquire information through a network as well as a related art web application such as the shown web browser. For example, when an electronic appliance such as an Internet protocol television (IPTV) is used, in consideration that an active letter input by a user is not as easy as compared with the web browser in a personal computer (PC), it can be seen that the exemplary embodiment of the present invention, in which visually simplified information is automatically acquired and displayed by a change in the appearance of a basic application and the user can recognize it by an indirect mood type, is more appropriate.

Types of information that can be periodically acquired and renewal periods applied to the exemplary embodiment of the present invention are exemplified as shown in the following table.

TABLE 1

| information type | content |
| --- | --- |
| weather | renew and display weather information on a particular region at an hour interval |
| stock price | renew and display a change in a stock price of a particular item at a minute interval |
| exchange rate | renew and display the exchange rate for the dollar or the yen at one day interval |
| traffic situation | renew and display a traffic situation of a particular region at a minute interval |
| daily horoscope | renew and display a daily horoscope according to age, Zodiac sign, and birthday at one day interval |
| biorhythm | renew and display biorhythm according to birthday at one day interval |
| sports result | renew and display the game result of a particular sports team at a minute interval |

Figure 7:
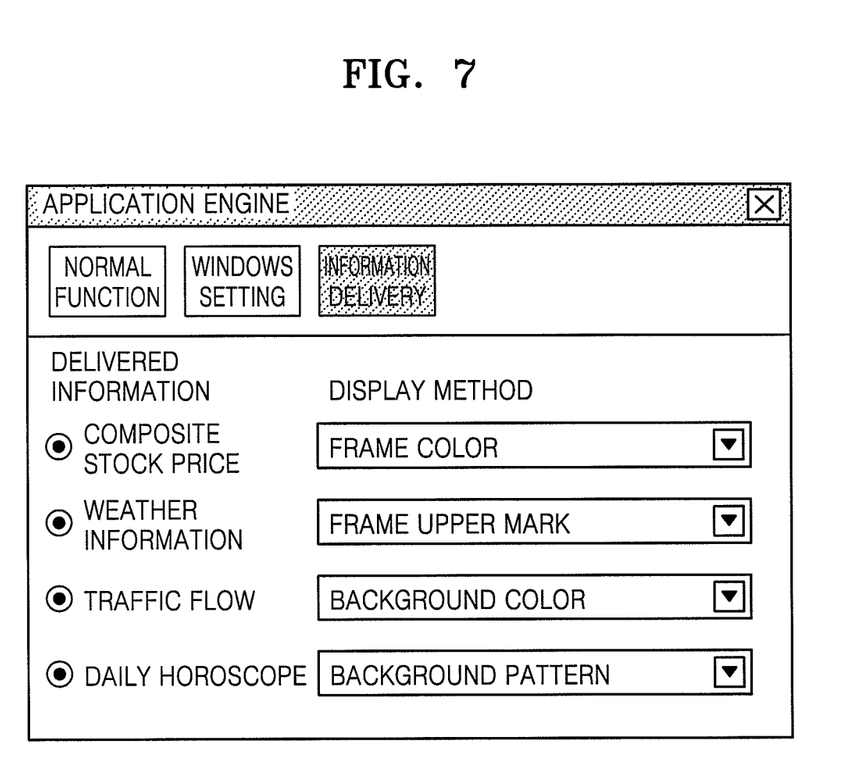
FIG. 7 is a view showing a method of setting correspondence relations between information which a user wants to obtain and the appearances of applications in an application engine, according to an exemplary embodiment of the present invention.

FIG. 7 is a view showing a method of setting correspondence relations between information which the user wants to obtain and the appearances of applications in an application engine according to an exemplary embodiment of the present invention.

In order to set the correspondence relations, the application engine provides a predetermined menu screen for setting items associated with information delivery on a set screen as shown in FIG. 7. The delivered information may be various types of information including information exemplified in Table 1, and the information is provided as a basic function of the application but not an additional function, so that correspondence relations between a plurality of the information and the appearance of an application are set and managed together on a single screen.

For example, for a composite stock price, the frame color may be turned blue or red according to a rise or fall of the stock price. For the weather information, a mark at an upper portion of the frame may be changed to a shape of the sun or an umbrella. For the traffic situation, a background color may be turned green, yellow, or red according to traffic flow. For the daily horoscope, a background pattern may be changed according to good or bad.

In addition, the set screen shown in FIG. 7 may be implemented by being subdivided to enable the user to select functions that can be displayed on the appearance of the application. For example, for the composite stock price, when a frame color is selected, a function of displaying a selection item to display a stock price rise time or a stock price fall time using a sub-selection item, and to set the color according to the user's taste may be provided. Similarly, for information such as the weather information, traffic flow, and daily horoscope, a sub-item for additionally inputting or selecting personal information such as a corresponding region or user's birthday may be provided. In this manner, as sub-items that can be selected by the user are layered and become varied, various appearance displays according to the user's taste are possible.

When the function of displaying information by the appearance of an application is added, or inversely, a type of information provided to the user is added, the application engine has to flexibly reflect this in the set screen. As a plug-in which is freely added to or deleted from a web browser, when an add-on function which can be implemented on an engine of a basic application is added, a function of managing the add-on function on a common set function may be supported.

Figure 8:
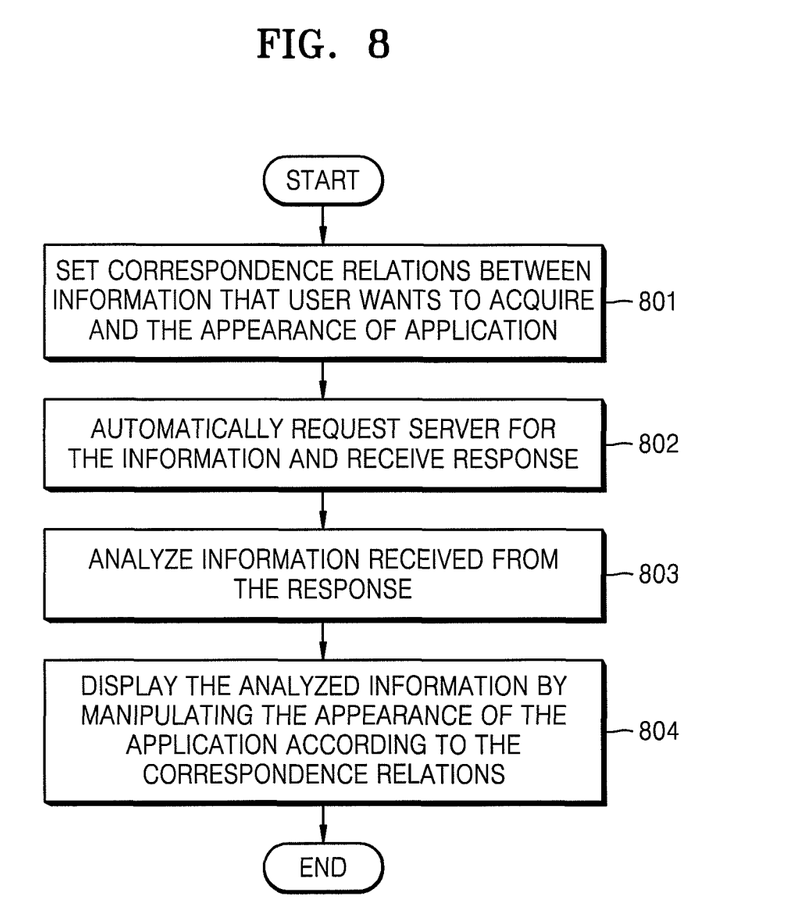
FIG. 8 is a flowchart of a method of displaying information acquired through a network by manipulating the appearance of an application, according to an exemplary embodiment of the present invention.

FIG. 8 is a flowchart of a method of displaying information acquired through a network by manipulating the appearance of an application according to an exemplary embodiment of the present invention. Referring to FIG. 8, the method of providing information through the network according to the current exemplary embodiment includes the following operations.

In operation 801, correspondence relations between information which the user wants to obtain and the appearance of the application are set. The information which the user wants to obtain may include the weather, a stock price, the exchange rate, time, a traffic situation, a daily horoscope, biorhythm, a sports game result, and the like, and relations showing how the information corresponds to changes in the appearance of the application according to types and contents of the information are set. For example, as described with reference to FIGS. 4A to 6, the color of the frame of the application is changed according to a rise or fall of a stock price, or the mark of the application, the background pattern of the application, or the shape of the frame are changed according to the clearness, rain, or thunder and lightning of the weather. In this manner, the correspondence relations are set.

The correspondence relation setting has to be specifically connected so that information that is to be acquired corresponds to various appearance change items of the application. In order to do this, the acquired information may be evaluated. This will be described in detail later in relation to operation 804.

In operation 802, a server is automatically requested for the information and a response to the request is received. This operation refers to a related art information request and response between a client and a server. In the current exemplary embodiment of the present invention, a case where the information request and response are performed during predetermined periods by using a communication means such as Rich Site Summary or Really Simple Syndication (RSS), Asynchronous JavaScript and XML (AJAX), or the like, is exemplified but not limited thereto.

The RSS refers to a means or standard for receiving time-varying information and updated information using a reader without directly visiting web pages that provide the information in order to retrieve the information. The AJAX refers to a complex of web programming techniques for processing a communication with a server corresponding to a request of a user in an asynchronous method through a background operation without waiting for a response from the server for an entire web page. The user can receive the time-varying information as periodically updated contents through the RSS and the AJAX. As the techniques are currently used, detailed descriptions thereof will be omitted here.

The predetermined period may be selected and set in operation 801 by the user according to the type and characteristics of the requested and received information, and this may be differently set in units of minutes, hours, days, or the like as exemplified in Table 1. In addition, actions of requesting the information and responding to the request in a predetermined period may be automatically performed without an additional input by the user.

In operation 803, the information received in the response is analyzed. The present invention is different from the related art in that the entire received information is not displayed on an additional application or through screen allocation but is visually displayed on an existing application. Therefore, in order to display the information received in operation 802 on the application of the user according to the correspondence relations set in operation 801, the received information has to be analyzed and elements used to determine a screen display have to be extracted.

For example, the stock price shown in FIGS. 4A and 4B may be the received information. However, in the current exemplary embodiment, the stock price is not displayed on an additional screen but a rise or fall of the stock price is displayed on the screen. Therefore, an operation of analyzing the rise or fall by comparing the received stock price information to a preceding stock price is needed. Similarly, for the weather, the current weather and the preceding weather are compared with each other, and when a change therebetween exists, an operation of displaying the changed content on the screen is needed. A case of the exchange rate is similar to the case of a stock price. For the traffic situation, as congestion increases, the color of the application is changed in the order of green, yellow, and red so as to display the increase in traffic. For the sports game, according to the result of the game of a sports team set by the user, when the team wins, an effect in which the screen blinks is used, and when the team loses, an effect in which the screen shakes is used. In this manner, the result may be visually delivered by using the effects.

In operation 804, the analyzed information is displayed on the appearance of the application according to the correspondence relation. In the aforementioned display operation, unlike with the related art, the analyzed information is directly displayed on the appearance of the application but not on an additional object. In the operation of displaying the information by manipulating the appearance of the application, a form of an object of the application, a shape of an object of the application, a color of an object of the application, a movement of an object of the application, and the like are changed so as to display the information.

More specifically, in addition to the examples shown in FIGS. 2A to 6, changes in a color, shape, and background pattern of an object of an application or an effect in which the application shakes may be applied. By using the visual and indirect information delivery method using the application appearance display, information can be efficiently provided without operating an additional application or allocating a screen as in the related art.

The object of the application refers to elements included in the application such as an application frame, a background screen, a mark display, and the like, and means a single object that can be controlled by the correspondence relations between information that the user wants to acquire and the appearance of the application. When it is a web browser for example, the object refers to a frame, an address bar, a status bar, a tool bar, buttons, and the like of the web browser, and individual control for the object according to the correspondence relation set by the user may be performed.

The display operation is performed according to the correspondence relation set in operation 801 on the basis of the information analyzed in operation 803. Therefore, the correspondence relation in operation 801 has to be specifically set according to a type and a content of the information to be acquired so as to specifically correspond to information of the appearance display of a corresponding application. In particular, in order to clearly divide the item as up and down or the like on the basis of specific data, decision elements may be evaluated. For example, for the weather, the elements that can be evaluated may be a temperature, a wind velocity, amount of rainfall, and the like.

Figure 9:
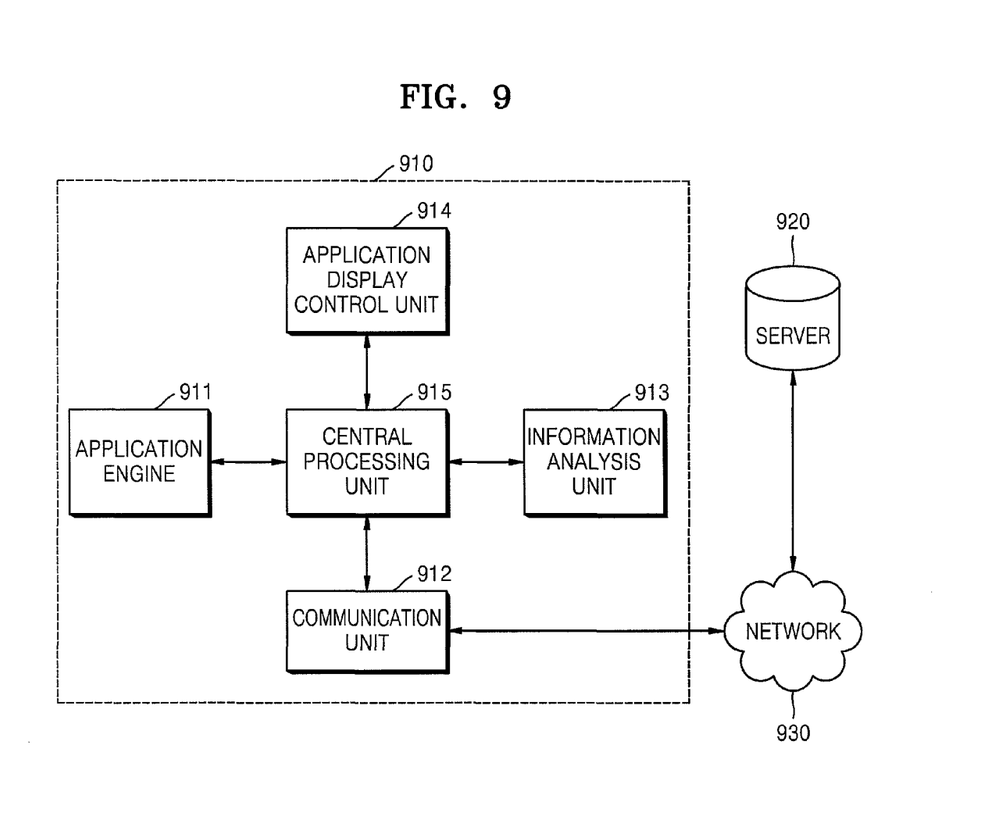
FIG. 9 is a view showing an apparatus for displaying information acquired through a network by manipulating the appearance of an application, according to an exemplary embodiment of the present invention.

FIG. 9 is a view showing an apparatus for displaying information acquired through a network by manipulating the appearance of an application according to an exemplary embodiment of the present invention. The apparatus mainly includes a client device 910, a server 920, and a network 930. The exemplary embodiment of the present invention mainly describes the client device 910. The client device 910 includes an application engine 911, a communication unit 912, an information analysis unit 913, an application display control unit 914, and a central processing unit (CPU) 915. Now, detailed components thereof will be described.

The application engine 911 sets correspondence relations between information that the user wants to acquire and the appearance of an application. This is described in operation 801 of FIG. 8, and therefore a detailed description will be omitted here.

The communication unit 912 automatically requests a server for the information and receives a response to the request. The communication unit 912 performs a counter function of requesting the information that the user wants to acquire and receiving the response to the request in communication between the client device 910 and the server 920 through the network 930.

The information analysis unit 913 analyzes the received information from the response. A detailed description is described above in relation to operation 803 of FIG. 8. The information analysis unit 913 may be physically implemented in the same device as that of the CPU 915 described later. However, for convenience of description, the information analysis unit 913 is separate from the CPU 915 due to a different function in FIG. 9.

The application display control unit 914 displays the analyzed information by manipulating the appearance of the application according to the correspondence relation. In the display operation, the analyzed information is directly displayed by manipulating the appearance of the application but not an additional object on a screen. The device may further include a screen unit for practically displaying the application. The application display control unit 914 performs a function of controlling and displaying various effects on the application currently displayed on the screen on the basis of the analysis of the acquired information.

The CPU 915 connects the components 911 to 914 in the client device 910 and controls signals therebetween.

The server 920 and the network 930 are a related art server for providing services and a network used as a communication basis therebetween, respectively.

Accordingly, an additional application in addition to a currently used application and screen allocation are not applied, but instead, the acquired information is visually simplified and provided. Therefore, user convenience increases, and natural user recognition when the information is acquired is possible. In addition, a function of setting and managing correspondence relations between the acquired information and the appearances of applications is provided, so that consistent and simple function control is possible.

Furthermore, there is provided an interface and display method capable of implementing information acquisition and extended application of display techniques that can be applied to general electronic appliances connected through a network in addition to a related art PC-based web application.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing information through a network by using a processor, the method comprising:
   executing a widget comprising a text content;
   requesting first information about a topic from a server on the network and receiving a response which includes the first information;
   analyzing, by using the processor, the received first information and determining a state of the received first information from among a plurality of states;
   obtaining second information relating to the topic, based on the determined state of the analyzed first information;
   setting a background of the widget; and
   displaying and maintaining all of the text content of the widget in a same position while changing the background of the widget to a background corresponding to the second information, based on the obtained second information.

2. The method of claim 1, further comprising setting a correspondence relationship between the second information relating to the topic and the background of the widget corresponding to the second information;
   wherein the setting of the correspondence relationship comprises providing a predetermined menu screen used for setting the correspondence relationship, and
   wherein the predetermined menu screen is a menu screen for setting one or more items of a plurality of items associated with the correspondence relationship.

3. The method of claim 1, wherein the topic comprises at least one of weather, a stock price, an exchange rate, a traffic situation, a daily horoscope, a biorhythm, and a sports game result.

4. The method of claim 1, wherein the requesting of the first information is performed automatically at a predetermined time interval.

5. The method of claim 1, wherein the requesting the first information and receiving the response is performed by using at least one of Rich Site Summary or Really Simple Syndication (RSS), and Asynchronous JavaScript and XML (AJAX).

6. The method of claim 1, wherein the first information is unrelated to the text content of the widget.

7. The method of claim 1, wherein the first information is selected from one of a stock price information, an exchange rate information, a traffic situation information, a daily horoscope information, a biorhythm information, and a sports game information.

8. The method of claim 1, wherein the requesting the server on the network for the first information and the receiving the response which includes the first information comprises requesting the server on the network for the first information at a predetermined time interval and receiving the response which includes the first information at the predetermined time interval.

9. The method of claim 1, wherein the background of the widget is automatically updated while the background of the widget is displayed as the state of the received first information changes between the plurality of states.

10. An apparatus for providing information through a network, comprising:
- a communication unit which requests first information about a topic from a server on the network and receives a response that includes the first information;
- an information analysis unit which analyzes the received first information, determines a state of the received first information from among a plurality of states, and obtains second information relating to the topic, based on the determined state of the analyzed first information; and
- an application display control unit which sets a background of a widget, displays and maintains all text content of the widget in a same position while changing the background of the widget to a background corresponding to the second information, based on the obtained second information.

11. The apparatus of claim 10, further comprising an application engine which sets a correspondence relationship between the second information relating to the topic and the background of the widget corresponding to the second information,
- wherein the application engine provides a predetermined menu screen used for setting the correspondence relationship, and
- wherein the predetermined menu screen is a menu screen used for setting one or more items of a plurality of items associated with the correspondence relationship.

12. The apparatus of claim 10, wherein the topic comprises at least one of weather, a stock price, an exchange rate, a traffic situation, a daily horoscope, a biorhythm, and a sports game result.

13. The apparatus of claim 10, wherein the communication unit automatically requests the first information and receives the response at a predetermined time interval.

14. The apparatus of claim 10, wherein the communication unit requests the first information and receives the response by using at least one of Rich Site Summary or Really Simple Syndication (RSS), and Asynchronous JavaScript and XML (AJAX).

* * * * *